US012659059B2

(12) United States Patent
Zhang et al.

(10) Patent No.: US 12,659,059 B2
(45) Date of Patent: Jun. 16, 2026

(54) INTERFERENCE CANCELLATION APPROACH FOR NEW RADIO SYSTEMS

(71) Applicant: MEDIATEK INC., Hsin-Chu (TW)

(72) Inventors: Bohan Zhang, San Jose, CA (US); Yabo Li, San Jose, CA (US); Wei-Jen Chen, Hsin-Chu (TW)

(73) Assignee: MediaTek Inc., Hsinchu City (TW)

( * ) Notice: Subject to any disclaimer, the term of this patent is extended or adjusted under 35 U.S.C. 154(b) by 748 days.

(21) Appl. No.: 18/088,697

(22) Filed: Dec. 26, 2022

(65) Prior Publication Data

US 2023/0216596 A1 Jul. 6, 2023

Related U.S. Application Data

(60) Provisional application No. 63/296,894, filed on Jan. 6, 2022.

(51) Int. Cl.
| | |
|---|---|
| *H04B 17/336* | (2015.01) |
| *H04W 24/02* | (2009.01) |
| *H04W 48/08* | (2009.01) |

(52) U.S. Cl.
CPC .......... *H04B 17/336* (2015.01); *H04W 24/02* (2013.01); *H04W 48/08* (2013.01)

(58) Field of Classification Search
CPC .... H04B 17/336; H04W 24/02; H04W 48/08; H04W 16/28
See application file for complete search history.

(56) References Cited

U.S. PATENT DOCUMENTS

| | | | |
|---|---|---|---|
| 9,553,680 B1 * | 1/2017 | Park | H04B 15/00 |
| 2017/0150414 A1 * | 5/2017 | Quan | H04W 36/20 |

| | | | |
|---|---|---|---|
| 2021/0176723 A1 | 6/2021 | Khoryaev | H04B 17/318 |
| 2021/0176764 A1 | 6/2021 | Abedini | H04W 48/20 |
| 2021/0274403 A1 | 9/2021 | Chen | H04L 1/00 |
| 2022/0322372 A1 * | 10/2022 | Takeda | H04J 11/005 |
| 2023/0010703 A1 * | 1/2023 | Schlegel | H04B 1/1036 |

(Continued)

FOREIGN PATENT DOCUMENTS

| | | | | |
|---|---|---|---|---|
| WO | WO-2019237801 A1 * | 12/2019 | | H04W 24/02 |

OTHER PUBLICATIONS

Taiwan Intellectual Property Office Action, dated Aug. 21, 2023 (10 pages).

*Primary Examiner* — Kevin C. Harper

*Assistant Examiner* — Salma Ayad

(74) *Attorney, Agent, or Firm* — Helen Mao; Zheng Jin; Imperium Patent Works

(57) ABSTRACT

A method to perform beam management (BM) and/or synchronization (Sync) with interference cancellation on synchronization signal block (SSB) is proposed. A UE determines interference level and/or pilot contamination level. The UE can then perform BM or Sync, with or without interference cancellation, adapt to the determined interference and pilot contamination level. If interference level is high, UE applies interference cancellation for BM and Sync. If interference level is low, UE does not apply interference cancellation for BM and Sync. If the pilot contamination level is high, then UE follows the 3-symbol mode, e.g., uses only PECH0 SSS, and PBCH2 symbols for BM or Sync. If the pilot contamination level is low, then UE follows the 4-symbol mode, e.g., uses PSS as an extra symbol for BM or Sync to improve system performance.

22 Claims, 5 Drawing Sheets

(56)          References Cited

U.S. PATENT DOCUMENTS

| 2023/0171757 | A1 * | 6/2023 | Gao | .................. | H04B 7/06952 |
| | | | | | 370/252 |
| 2023/0180089 | A1 * | 6/2023 | Panwar | ................ | H04W 36/30 |
| | | | | | 370/331 |
| 2025/0007591 | A1 * | 1/2025 | Athley | .................. | H04B 7/088 |

* cited by examiner

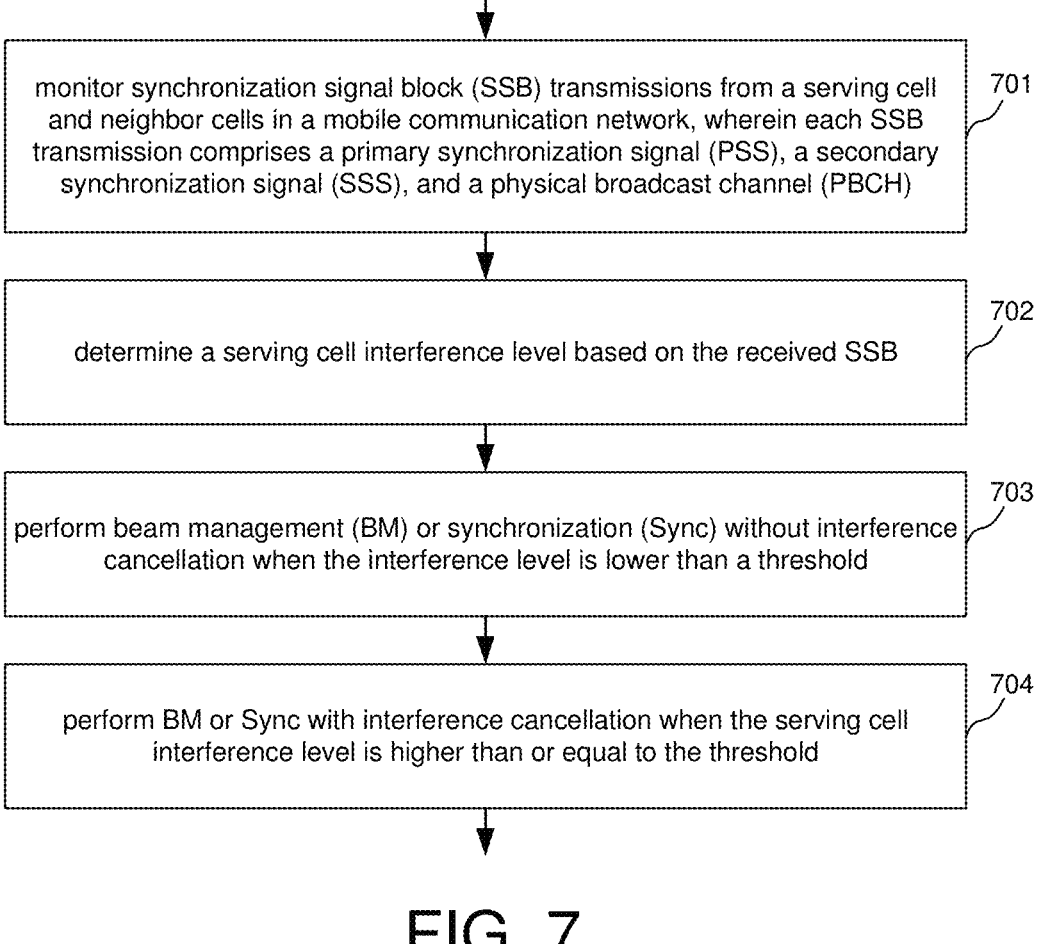

monitor synchronization signal block (SSB) transmissions from a serving cell and neighbor cells in a mobile communication network, wherein each SSB transmission comprises a primary synchronization signal (PSS), a secondary synchronization signal (SSS), and a physical broadcast channel (PBCH)    701 determine a serving cell interference level based on the received SSB    702 perform beam management (BM) or synchronization (Sync) without interference cancellation when the interference level is lower than a threshold    703 perform BM or Sync with interference cancellation when the serving cell interference level is higher than or equal to the threshold    704

FIG. 7

INTERFERENCE CANCELLATION APPROACH FOR NEW RADIO SYSTEMS

CROSS REFERENCE TO RELATED APPLICATIONS

This application claims priority under 35 U.S.C. § 119 from U.S. Provisional Application No. 63/296,894, entitled "Interference Cancellation Approach for New Radio Systems", filed on Jan. 6, 2022, the subject matter of which is incorporated herein by reference.

TECHNICAL FIELD

The disclosed embodiments relate generally to wireless communication, and, more particularly, to a method for interference cancellation in 5G New Radio (NR) cellular communication networks.

BACKGROUND

The wireless communications network has grown exponentially over the years. A long-term evolution (LTE) system offers high peak data rates, low latency, improved system capacity, and low operating cost resulting from simplified network architecture. LTE systems, also known as the 4G system, also provide seamless integration to older wireless network, such as GSM, CDMA and universal mobile telecommunication system (UMTS). In LTE systems, an evolved universal terrestrial radio access network (E-UTRAN) includes a plurality of evolved Node-Bs (eNodeBs or eNBs) communicating with a plurality of mobile stations, referred to as user equipments (UEs). The $3^{rd}$ generation partner project (3GPP) network normally includes a hybrid of 2G/3G/4G systems. The next generation mobile network (NGMN) board has decided to focus the future NGMN activities on defining the end-to-end requirements for 5G new radio (NR) systems. In 5G NR, the base stations are also referred to as gNodeBs or gNBs.

Frequency bands for 5G NR are being separated into two different frequency ranges. Frequency Range (FP1) includes sub-6 GHz frequency bands, some of which are bands traditionally used by previous standards, but has been extended to cover potential new spectrum offerings from 410 MHz to 7125 MHz. Frequency Range 2 (FR2) includes frequency bands from 24.25 GHz to 71.0 GHz. Bands in FP2 in this millimeter wave (mil) range have shorter propagation range but higher available bandwidth than bands in FR1. To compensate for high propagation loss in 5G mmWave systems, a UE is usually equipped with multiple antennas to enable beamforming. For downlink data reception, beam management (BM), synchronization (both time and frequency), and accurate layer 1 (L1) measurements of reference signals are required at a UE.

As in LIE, the primary synchronization signal (PSS) and the secondary synchronization signal (SSS) in 5G NR represent the physical cell identity (PCI), and the Physical broadcast channel (PBCH) carries the master information block (MIB). The SS Block (SSB) in 5G NR stands for Synchronization Signal Block and it refers to synchronization signal (PSS/SSS) and PBCH block because the synchronization signal and PBCH channel are packed as a single block. The SSB is transmitted periodically and each SSB burst comprises PSS/SSS and PBCH. Specifically, SSB with four OFDM symbols PBCH0, SSS, PBCH2) is a good reference signal to perform beam management (BM) and synchronization (Sync) at a UE. In a scenario where gNBs are densely distributed, UE may suffer from neighbour cell interference on serving cell SSB, as well as pilot contamination on PSS, therefore the performance of BM and Sync may degrade. Mitigating the interference on SSB when it is necessary and feasible can improve the performance of BM and Sync.

SUMMARY

A method to perform beam management (BM) and/or synchronization (Sync) with interference cancellation on synchronization signal block (SSB) is proposed. A UE determines interference level and/or pilot contamination level. The UP can then perform BM or Sync, with or without interference cancellation, adapt to the determined interference and pilot contamination level. If interference level is high, UP applies interference cancellation for BM and Sync. If interference level is low, UP does not apply interference cancellation for BM and Sync. If the pilot contamination level is high, then UE follows the 3-symbol mode, e.g., uses only PBCH0, SSS, and PBCH2 symbols for BM or Sync. If the pilot contamination level is low, then UP follows the 4-symbol mode, e.g., uses PSS as an extra symbol for BM or Sync to improve system. performance.

In one embodiment, a UE monitors synchronization signal block (SSB) transmissions from a serving cell and neighbor cells in a mobile communication network, wherein each SSB transmission comprises a primary synchronization signal (PSS), a secondary synchronization signal (SSS), and a physical broadcast channel (PBCH). The UE determines a serving cell interference level based on the received SSB. The UE performs beam management (BM) or synchronization (Sync) without interference cancellation when the interference level is lower than a threshold. The UE performs BM or Sync with interference cancellation when the serving cell interference level is higher than or equal to the threshold.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 7 is a flow chart of a first method of performing adaptive interference cancellation for BM and Sync in accordance with one novel aspect.

DETAILED DESCRIPTION

Reference will now be made in detail to some embodiments of the invention, examples of which are illustrated in the accompanying drawings.

Figure 1:
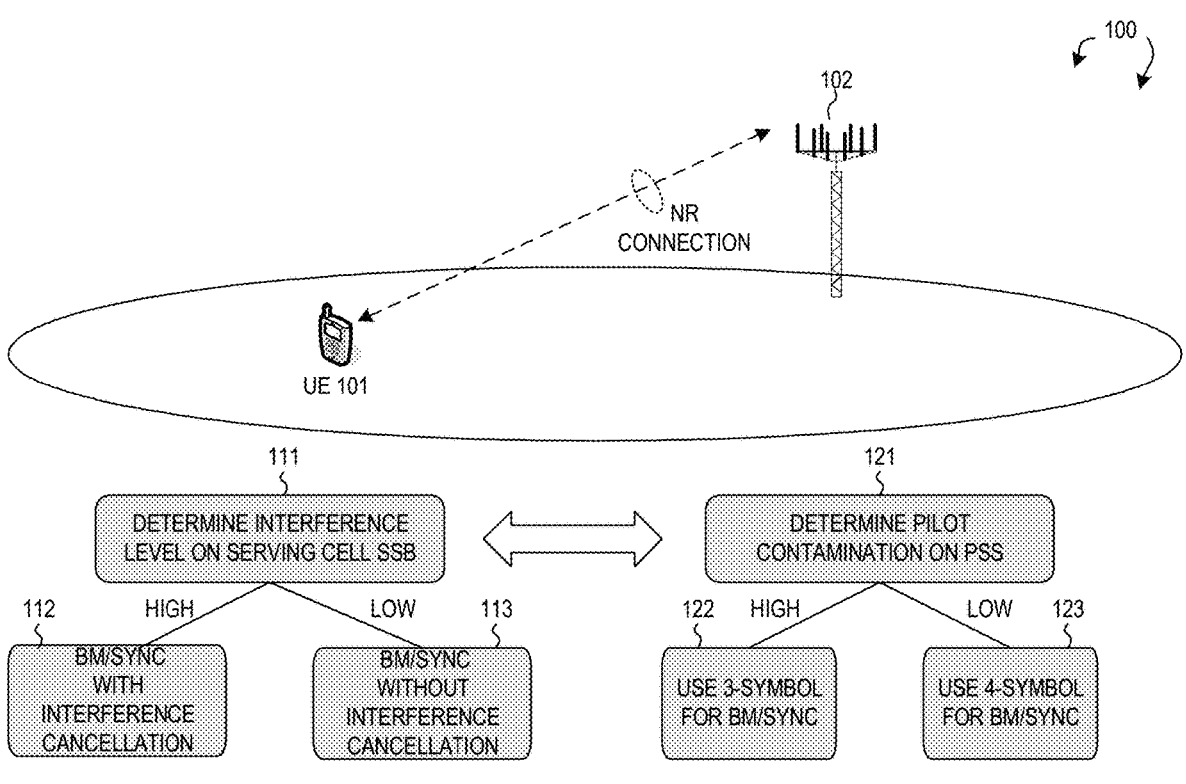
FIG. 1 illustrates an exemplary 5G New Radio (NR) network, where a UE supports adaptive interference cancellation for beam management (BM) and synchronization (Sync) using synchronization signal block (SSB) in accordance with aspects of the current invention.

FIG. 1 illustrates an exemplary 5G New Radio (NR) network 100, where a User Equipment (UE) supports adaptive interference cancellation for beam management (BM) and synchronization (Sync) using synchronization signal block (SSB) in accordance with aspects of the current invention. The 5G NR network 100 comprises a User Equipment (UE) 101 and a plurality of base stations including a serving gNB 102. UE 101 is communicatively connected to the serving gNB 102, which provides radio access using a Radio Access Technology (RAT) (e.g., the 5G NR technology). The UE 101 may be a smart phone, a wearable device, an Internet of Things (IoT) device, and a tablet, etc. Alternatively, UE 101 may be a Notebook (NB), or Personal Computer (PC) inserted or installed with a data card which includes a modem and RF transceiver(s) to provide the functionality of wireless communication. To compensate for high propagation loss in 5G mmWave systems, a UE is usually equipped with multiple antennas to enable beamforming. For downlink (DL) data reception, beam management (BM), synchronization (Sync), and accurate L1 measurements of reference signals are required at a UE.

As in LTE, the primary synchronization signal (PSS) and the secondary synchronization signal (SSS) in 5G NR represent the physical cell identity (PCI), and the Physical broadcast channel (PBCH) carries the master information block (MIB). The SS Block (SSB) in 5G NR stands for Synchronization Signal Block and it refers to synchronization signal (PSS/SSS) and PBCH block because the synchronization signal and PBCH channel are packed as a single block. The SSB is transmitted periodically and each SSB burst comprises PSS/SSS and PBCH. Specifically, SSB with four OFDM symbols PBCH0, SSS, PBCH2) is a good reference signal for UP to perform BM and Sync. In a scenario where qNBs are densely distributed, UE may suffer from neighbour cell interference on serving cell SSB, as well as pilot contamination on PSS, therefore the performance of BM and Sync may degrade. Mitigating the interference on SSB when it is necessary and feasible can improve the performance of BM and Sync.

In accordance with one novel aspect, to improve system performance, a method is proposed to adaptively perform interference cancellation for beam management (BM) and synchronization (Sync), based on interference level on serving cell SSB, and also based on pilot contamination level on PSS. In the example of FIG. 1, UE 101 first determines interference level (step 111) and/or pilot contamination level (step 121). UE 101 can then perform BM or Sync, with or without interference cancellation, adapt to the determined interference and pilot contamination level. If interference level is high, UE 101 applies Interference cancellation for BM and Sync (112). If interference level is low, UE 101 does not apply interference cancellation for BM and Sync (113). If the plot contamination level is high, then UE 101 follows the 3-symbol mode, e.g., uses only PBCH0, SSS, and PBCH2 symbols for BM or Sync (122). If the pilot contamination level is low, then UE 101 follows the 4-symbol mode (123), e.g., uses PSS as an extra symbol for BM or Sync to improve system performance.

Figure 2:
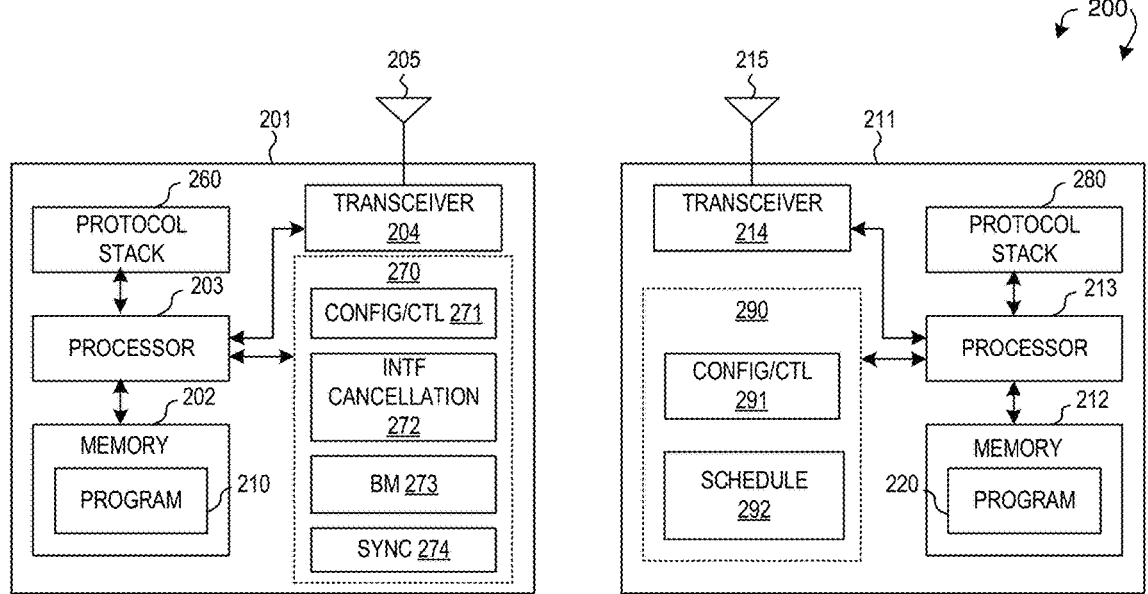
FIG. 2 illustrates simplified block diagrams of wireless devices, e.g., a UE and a gNB in accordance with embodiments of the current invention.

FIG. 2 illustrates simplified block diagrams of wireless devices, e.g., a UE 201 and a gNB 211 in accordance with embodiments of the current invention in 5G NR network 200. The gNB 211 has an antenna 215, which transmits and receives radio signals. An RF transceiver module 214, coupled with the antenna 215, receives RF signals from the antenna 215, converts them to baseband signals and sends them to the processor 213. The RF transceiver 214 also converts received baseband signals from the processor 213, converts them to RF signals, and sends out to the antenna 215. The processor 213 processes the received baseband signals and invokes different functional modules to perform features in the gNB 211. The memory 212 stores program instructions and data 220 to control the operations of the gNB 211. In the example of FIG. 2, the gNB 211 also includes a protocol stack 280 and a set of control function modules and circuits 290. The protocol stack 280 may include a Non-Access-Stratum (NAS) layer to communicate with an AMF/SMF/MME entity connecting to the core network, a Radio Resource Control (RRC) layer for high layer configuration and control, a Packet Data Convergence Protocol/Radio Link Control (PDCP/RLC) layer, a Media Access Control (MAC) layer, and a Physical (PHY) layer. In one example, the control function modules and circuits 290 include a configuration circuit for configuring measurements report and active set for UE, and a handover handling circuit for sending cell-switch to the UE upon handover decision.

Similarly, the UE 201 has a memory 202, a processor 203, and an RF transceiver module 204. The RF transceiver 204 is coupled with the antenna 205, receives RF signals from the antenna 205, converts them to baseband signals, and sends them to the processor 203. The RF transceiver 204 also converts received baseband signals from the processor 203, converts them to RF signals, and sends out to the antenna 205. The processor 203 processes the received baseband signals and invokes different functional modules and circuits to perform features in the UE 201. The memory 202 stores data and program instructions 210 to be executed by the processor 203 to control the operations of the UE 201. Suitable processors include, by way of example, a special purpose processor, a Digital Signal Processor (DSP), a plurality of micro-processors, one or more micro-processor associated with a DSP core, a controller, a microcontroller, Application Specific Integrated Circuits (ASICs), File Programmable Gate Array (FPGA) circuits, and other type of Integrated Circuits (ICs), and/or state machines. A processor in associated with software may be used to implement and configure features of the UE 201.

The UE 201 also includes a protocol stack 260 and a set of control function modules and circuits 270. The protocol stack 260 may include a NAS layer to communicate with an AMF/SMF/MME entity connecting to the core network, an RRC layer for high layer configuration and control, a PDCP/RLC layer, a MAC layer, and a PHY layer. The Control function modules and circuits 270 may be implemented and configured by software, firmware, hardware, and/or combination thereof. The control function modules and circuits 270, when executed by the processor 203 via program instructions contained in the memory 202, interwork with each other to allow the UE 201 to perform embodiments and functional tasks and features in the network. In one example, the control function modules and circuits 270 include a configuration and control circuit 271 for obtaining measurements and configuration information and controlling corresponding operation, an interference cancellation circuit 272 for performing interference detection and cancellation, a beam management circuit 273 for performing DL and UL beam management, and a synchronization handling circuit 274 for performing synchronization functionalities based on the configuration received from the network.

Both the interference and pilot contamination on serving cell SSB are issues to be considered for performing BM and Sync. As described above, SSB consists of synchronization signal (PSS, SSS) and PBCH. Synchronization signal is used for cell ID detection and synchronization. In addition, beam management (EM) procedure is used in 5G NR in order to acquire and maintain a set of beams to ensure that gNB and UE beams are aligned for data communication. Specifically, SSB is packed with four OFDM symbols (PSS, PBCH0, SSS, PBCH2) for UE to perform BM and Sync using all or part of the symbols. Each base station and serving/neighboring cell generates its own SSE, based on the Physical Cell ID ($N_{ID}^{(cell)}$), and the SSB index. There are correlations between the SSB transmissions from the serving base station and neighboring base stations in serving cell and neighboring cells. Depending on network deployment, the correlations are also different.

For PSS generation, the value of PSS depends on the sector cell ID $$N_{ID}^{(2)} \in \{0, 1, 2\},$$

and therefore PSS only has three sequences to choose from; For SSS generation, the sequence of SSS depends on the composite cell ID $$N_{ID}^{(1)} \in \{0, 1, \ldots, 335\}\left(N_{ID}^{cell} = 3N_{ID}^{(1)} + N_{ID}^{(2)}\right),$$

and therefore SSS has 336 sequences to choose from; For PBCH generation, the sequence for PBCH-DMRS depends on SSB index and Physical cell ID, where SSB index determine its scrambling sequency, Physical cell ID determine its frequency location. The pilot contamination level on PSS thus depends on network deployment scenarios. In the example of a denser network deployment, it is likely that the neighboring cell may use the same PSS as the serving cell. Therefore, PSS of the serving cell may suffer from pilot contamination. As a comparison, in the example of a sparser deployment, the neighboring cell and serving cell are likely to use different PSS. When PSS of serving cell is contaminated by neighbor cells, it is not reliable to use PSS for BM and Sync. In contrast, if PSS of the serving cell is free from pilot contamination, it can be used as an extra symbol for BM and Sync to improve performance.

Figure 3:
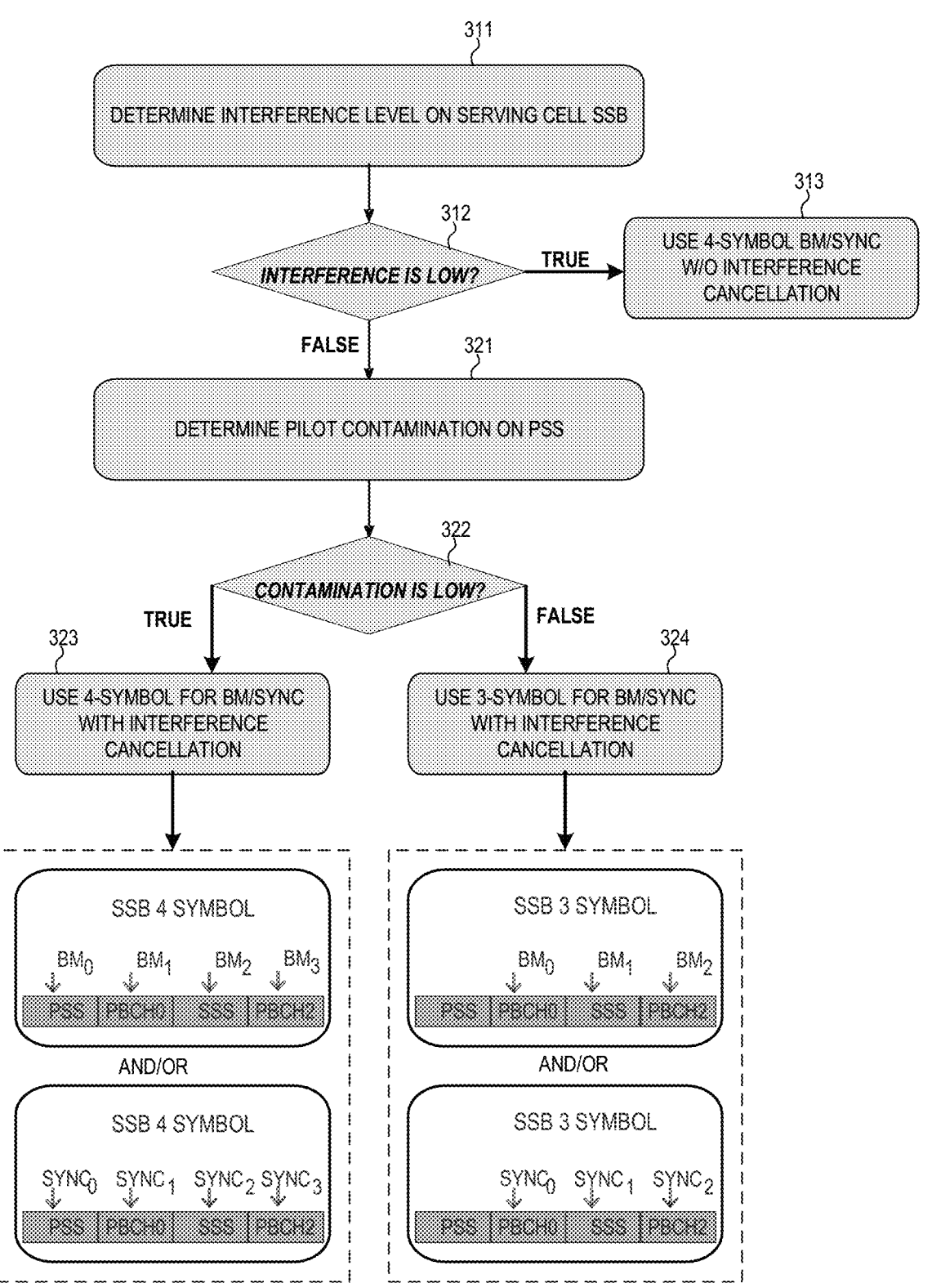
FIG. 3 illustrates a first embodiment of adaptive interference cancellation for BM and Sync, where the UE first determines interference level on serving cell SSB and then determines pilot contamination on PSS.

FIG. 3 illustrates a first embodiment of adaptive interference cancellation for BM and Sync, where the UE first determines interference level on serving cell SSB and then determines pilot contamination on PSS. In step 311, a UE determines the interference level on serving cell SSB. In step 312, the UE checks if the interference level is low, e.g., SIR is higher than a predefined threshold. If true, then the UE performs BM/Sync without interference cancellation. In addition, the UE assumes that pilot contamination on PSS is also low and utilizes all 4-symbol SSB for the BM/Sync procedure. If the answer to step 312 is false, then the UE goes to step 321 and determines the pilot contamination level on PSS. In step 322, the UE checks whether the pilot contamination level on PSS is low, e.g., lower than a predefined threshold. If true, then the UE uses 4-symbol SSB for performing BM/Sync with interference cancellation (step 323). If the answer to step 322 is false, then the UE uses 3-symbol SSB for performing BM/Sync with interference cancellation (step 324), by skipping PSS.

Figure 4:
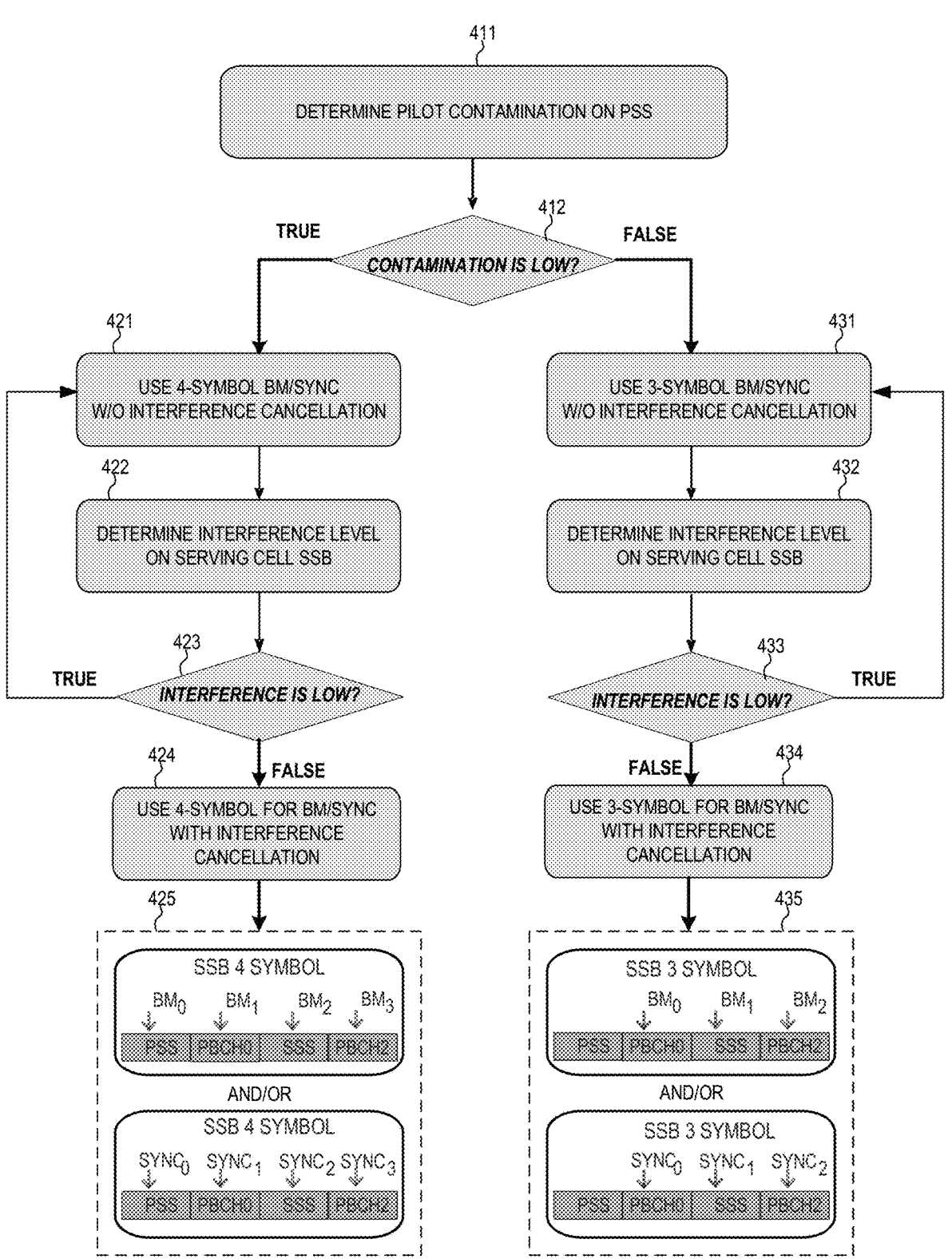
FIG. 4 illustrates a second embodiment of adaptive interference cancellation for BM and Sync, where the UE first determines pilot contamination on PSS and then determines interference level on serving cell SSB.

FIG. 4 illustrates a second embodiment of adaptive interference cancellation for BM and Sync, where the UE first determines pilot contamination on PSS and then determines interference level on serving cell SSB. In step 411, a UE determines the pilot contamination level on PSS. In step 412, the UE checks whether the pilot contamination level on PSS is low, e.g., lower than a predefined threshold. If true, then the UE uses 4-symbol SSB for performing BM/Sync without interference cancellation (step 421). In step 422, the UE further determines the interference level on serving cell SSB. In step 423, the UE checks if the interference level is low, e.g., SIR is higher than a predefined threshold. If true, then the UE goes back to step 421 and performs BM/Sync without interference cancellation. If the answer to step 423 is false, then the UE goes to step 424 and uses 4-symbol SSB for performing BM/Sync with interference cancellation. Step 425 is an example of BM/Sync using all four SSB OFDM symbols for performing the procedure.

If the answer to step 412 is false, then the UE uses 3-symbol SSB for performing BM/Sync without interference cancellation (step 431). In step 432, the UE determines the interference level on serving cell SSB. In step 433, the UE checks if the interference level is low, e.g., SIR is higher than a predefined threshold. If true, then the UE goes back to step 431 and performs BM/Sync without interference cancellation. If the answer to step 433 is false, then the UE goes to step 434 and uses 3-symbol SSB for performing BM/Sync with interference cancellation. Step 435 is an example of BM/Sync using three SSB OFDM symbols for performing the procedure.

Figure 5:
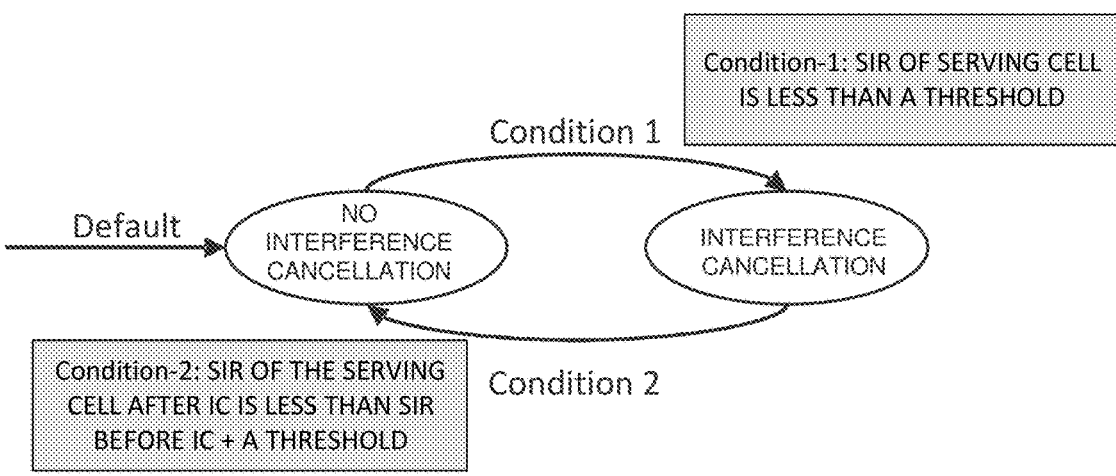
FIG. 5 illustrates a state machine maintained by a UE for adaptively performing interference cancellation based on predefined conditions.

FIG. 5 illustrates a state machine maintained by a UE for adaptively performing interference cancellation based on predefined conditions. In the embodiment of FIG. 5, two different methods are used for performing BM and Sync: without interference cancellation and with interference cancellation. In one novel aspect, a state machine is proposed to switch between the two methods of BM and Sync, depending on the detected signal to Interference Ratio (SIR), with (after) and without (before) interference cancellation. Iwo condition, are predefined for the switching between the two BM and Sync Methods. Condition-1 is defined as the SIR of the serving cell is lower than a predefined threshold: $SIR_{SC} < SIR_{Th}$; Condition-2 is defined as the SIP of the serving with (after) interference cancellation is lower than the SIR of the serving cell without (before) interference cancellation plus a threshold: $SIR_{SC, after} < SIR_{SC, prev} + Th$. If Condition-1 is satisfied, it means that the SIR of the serving cell is low and the UE is triggered to apply interference cancellation; if Condition-2 is satisfied, it means that interference cancellation does not improve SIR by much. Then, the UE rolls back to the operation to perform BM and Sync without interference cancellation.

Figure 6:
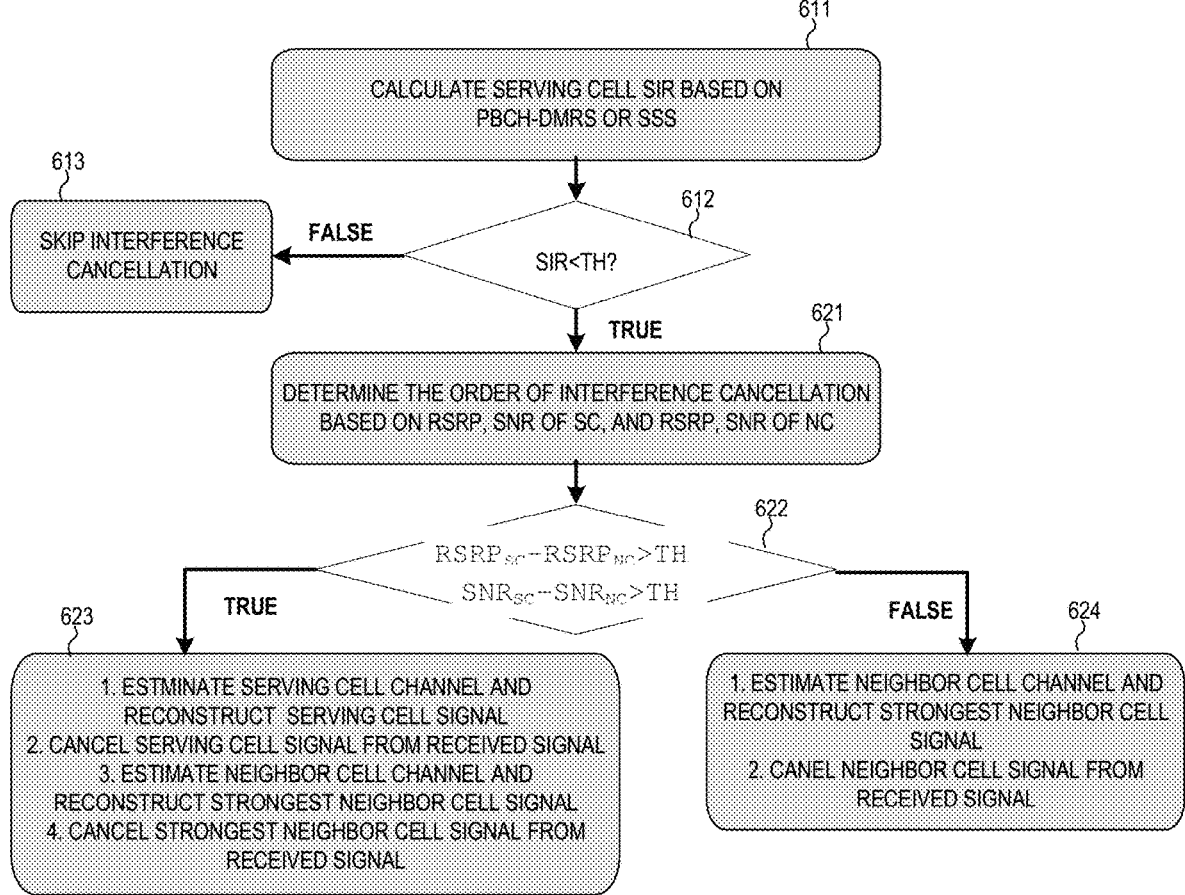
FIG. 6 illustrates an embodiment of interference level detection and determining an order of interference cancellation based on predefined conditions.

FIG. 6 illustrates an embodiment of interference level detection and determining an order of interference cancellation based on predefined conditions. A UE monitors SSB transmission from the serving cell and neighbor cells. In step 611, a UE calculates the serving cell $SIR_{SC}$ based on PBCH-DMRS or SSS. In one example, the serving cell $SIR_{SC}$ is calculated as follows: Total Symbol Power=Estimated Signal Power+Interference Power+System Noise Power; Interference Power=Total Symbol Power−Estimated Signal Power−System Noise Power; and SIR=Estimated Signal Power/Interference Power. In step 612, the UE checks whether the serving cell $SIR_{SC}$ is less than a predefined threshold. If false, it means that the SIR of the serving cell is high, and the UE can skip interference cancellation (step 613). If true, it means that the SIR of the serving cell is low, and the OF may apply interference cancellation. In step 621, the UE determines the order of interference cancellation based on the radio signal strength and quality of the serving cell and neighbor cell: $RSRP_{SC}$, $SNR_{SC}$ and $RSRP_{NC}$, $SNR_{NC}$.

In step 622, the UE checks whether the RSRP or SNR difference between the serving cell and the neighbor cell is larger than a threshold. If the answer is yes, then the UE goes to step 623; otherwise, the UE goes to step 624. In step 623, the UE performs the following sub-steps: Step 1: Estimate serving cell channel and reconstruct serving cell signal; Step 2: Cancel serving cell signal from received signal (received signal=serving cell signal+neighbor cell signals+system noise); Step 3: Estimate neighbor cell channel and reconstruct the strongest neighbor cell signal based on the signal after Step 2; Step 4: Cancel strongest neighbor cell signal from the original received signal. In step 624, the UE performs the following sub-steps: Step 1: Estimate neighbor cell channel and reconstruct the strongest neighbor cell signal; Step 2: Cancel neighbor cell signal from received signal (received signal=serving cell signal+neighbor cell signals+system noise).

FIG. 7 is a flow chart of a first method of performing adaptive interference cancellation for BM and Sync in accordance with one novel aspect. In step 701, a UE monitors synchronization signal block (SSB) transmissions from a serving cell and neighbor cells in a mobile communication network, wherein each SSB transmission comprises a primary synchronization signal (PSS), a secondary synchronization signal (SSS), and a physical broadcast channel (PBCH). In step 702, the UE determines a serving cell interference level based on the received SSB. In step 703, the UE performs beam management (BM) or synchronization (Sync) without interference cancellation when the interference level is lower than a threshold. In step 704, the UE performs BM or Sync with interference cancellation when the serving cell interference level is higher than or equal to the threshold.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
monitoring synchronization signal block (SSB) transmissions from a serving cell and neighbor cells by a User Equipment (UE) in a mobile communication network, wherein each SSB transmission comprises a primary synchronization signal (PSS), a secondary synchronization signal (SSS), and a physical broadcast channel (PBCH);
determining, by the UE, a serving cell interference level based on the received SSB;
performing, by the UE, beam management (BM) or synchronization (Sync) without interference cancellation when the interference level is lower than a threshold; and
performing, by the UE, BM or Sync with interference cancellation when the serving cell interference level is higher than or equal to the threshold.

2. The method of claim 1, wherein the interference level is determined by calculating a signal to interference ratio (SIR) based on received SSBs of the serving cell.

3. The method of claim 1, further comprising:
determining a pilot contamination level on PSS of the serving cell.

4. The method of claim 3, wherein the UE performs BM or Sync using only the SSS and the PBCH symbols when the pilot contamination level on PSS is higher than or equal to a predetermined threshold.

5. The method of claim 3, wherein the UE performs BM or Sync using the PSS, the SSS, and the PBCH symbols when the pilot contamination level on PSS is lower than a threshold.

6. The method of claim 3, wherein the UE determines the pilot contamination level on PSS either before or after the UE determines the serving cell interference level based on the received SSB.

7. The method of claim 1, wherein the UE maintains a state machine for switching between performing BM or Sync with interference cancellation and without interference cancellation.

8. The method of claim 7, wherein the UE switches from performing BM or Sync with interference cancellation to without interference cancellation when the serving cell interference level is not reduced by a predetermined threshold.

9. The method of claim 1, wherein the UE determines an order of the interference cancellation based on radio signal strength and quality of the serving cell and the neighbor cells.

10. The method of claim 9, wherein the UE reconstructs a serving cell signal from the received signal, cancel the serving cell signal from the received signal, then reconstructs a strongest neighbor cell signal, and then cancel the strongest neighbor cell signal from the received signal, when the radio signal strength or quality difference between the serving cell and the neighbor cells is larger than or equal to a predetermined threshold.

11. The method of claim 9, wherein the UE reconstructs a strongest neighbor cell signal, and then cancel a strongest neighbor cell signal from the received signal, when the radio signal strength or quality difference between the serving cell and the neighbor cells is smaller than a predetermined threshold.

12. A User Equipment (UE), comprising:
a receiver that receives synchronization signal block (SSB) transmissions from a serving cell and neighbor cells in a mobile communication network, wherein each SSB transmission comprises a primary synchronization signal (PSS), a secondary synchronization signal (SSS), and a physical broadcast channel (PBCH);
a memory; and
a processor coupled to the memory, the processor configured to
determine a serving cell interference level based on the received SSB; and
perform BM or Sync without interference cancellation when the interference level is lower than a threshold, and performs BM or Sync with interference cancellation when the serving cell interference level is higher than or equal to the threshold.

13. The UE of claim 12, wherein the interference level is determined by calculating a signal to interference ratio (SIR) based on received SSBs of the serving cell.

14. The UE of claim 12, further comprising:

determining a pilot contamination level on PSS of the serving cell.

15. The UE of claim 14, wherein the UE performs BM or Sync using only the SSS and the PBCH symbols when the pilot contamination level on PSS is higher than or equal to a predetermined threshold.

16. The UE of claim 14, wherein the UE performs BM or Sync using the PSS, the SSS, and the PBCH symbols when the pilot contamination level on PSS is lower than a threshold.

17. The UE of claim 14, wherein the UE determines the pilot contamination level on PSS either before or after the UE determines the serving cell interference level based on the received SSB.

18. The UE of claim 12, wherein the UE maintains a state machine for switching between performing BM or Sync with interference cancellation and without interference cancellation.

19. The UE of claim 18, wherein the UE switches from performing BM or Sync with interference cancellation to without interference cancellation when the serving cell interference level is not reduced by a predetermined threshold.

20. The UE of claim 12, wherein the UE determines an order of the interference cancellation based on radio signal strength and quality of the serving cell and the neighbor cells.

21. The UE of claim 20, wherein the UE reconstructs a serving cell signa☐ from a received signal, cancel the serving cell signal from the received signal, then reconstructs a strongest neighbor cell signal, and then cancel the strongest neighbor cell signal from the signal, when the radio signal strength or quality difference between the serving cell and the neighbor cells is larger than a predetermined threshold.

22. The UE of claim 20, wherein the UE reconstructs a strongest neighbor cell signal, and then cancel a strongest neighbor cell signal from the received signal, when the radio signal strength or quality difference between the serving cell and the neighbor cells is smaller than a predetermined threshold.

\* \* \* \* \*